United States Patent
Choi et al.

(10) Patent No.: US 8,900,501 B2
(45) Date of Patent: Dec. 2, 2014

(54) METHOD FOR MANUFACTURING CRASH PAD FOR VEHICLE AND CRASH PAD MANUFACTURED THEREBY

(75) Inventors: Cheal Soo Choi, Hwaseong-si (KR); Byung Seok Kong, Gunpo-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 167 days.

(21) Appl. No.: 13/172,718

(22) Filed: Jun. 29, 2011

(65) Prior Publication Data

US 2012/0139214 A1    Jun. 7, 2012

(30) Foreign Application Priority Data

Dec. 3, 2010    (KR) ........................ 10-2010-0123071

(51) Int. Cl.
| | |
|---|---|
| *B29C 45/14* | (2006.01) |
| *B29C 45/22* | (2006.01) |
| *B60R 21/215* | (2011.01) |
| *B60R 21/045* | (2006.01) |
| *B29C 45/16* | (2006.01) |
| *B29C 45/56* | (2006.01) |
| *B29C 45/00* | (2006.01) |
| *B29L 31/30* | (2006.01) |

(52) U.S. Cl.
CPC ....... *B60R 21/215* (2013.01); *B29L 2031/3038* (2013.01); *B60R 21/045* (2013.01); *B29C 45/1676* (2013.01); *B29C 45/561* (2013.01); *B29C 45/1671* (2013.01); *B29C 45/0046* (2013.01)
USPC ........................................ 264/255; 264/328.7

(58) Field of Classification Search
USPC ........................................ 264/254, 255, 328.7
See application file for complete search history.

(56) References Cited

U.S. PATENT DOCUMENTS

| 5,429,786 A | * | 7/1995 | Jogan et al. ............... 264/255 |
| 5,618,485 A | * | 4/1997 | Gajewski ................... 264/255 |
| 7,926,842 B2 | | 4/2011 | Kong | |

FOREIGN PATENT DOCUMENTS

| JP | 10-34696 A | 2/1998 |
| JP | 2001-294060 A | 10/2001 |
| KR | 10-0752229 B1 | 8/2007 |
| KR | 10-2007-0122296 A | 12/2007 |
| KR | 10-0812835 B1 | 3/2008 |
| KR | 10-0828817 B1 | 5/2008 |
| KR | 10-2009-0014813 A | 2/2009 |
| KR | 10-2009-0046119 A | 5/2009 |
| KR | 10-2009-0062127 A | 6/2009 |

* cited by examiner

*Primary Examiner* — Ryan Ochylski
(74) *Attorney, Agent, or Firm* — Morgan, Lewis & Bockius LLP

(57) ABSTRACT

A method for manufacturing a crash pad for a vehicle, may include (a) preparing a die including an upper die and a lower die for forming a first cavity for a Passenger Air Bag (PAB) door and a second cavity for a crash pad body, between the upper die and the lower die, (b) fixing a skin foam on an upper surface of the lower die, (c) moving the upper die in an upward direction in a predetermined distance and filling the first cavity for the PAB door with a first material and the second cavity for the crash pad body with a second material, (d) moving the upper die in a downward direction to compress the first and second materials against the lower die, while the first and second cavities may be filled with the first material and the second material, and (e) extracting a core of the PAB door and the crash pad body integrally formed with the skin foam from the die.

4 Claims, 7 Drawing Sheets

METHOD FOR MANUFACTURING CRASH PAD FOR VEHICLE AND CRASH PAD MANUFACTURED THEREBY

CROSS-REFERENCE TO RELATED APPLICATION

The present application claims priority to Korean Patent Application No. 10-2010-0123071, filed on Dec. 3, 2010 in the Korean Intellectual Property Office, the entire contents of which is incorporated herein for all purposes by this reference.

BACKGROUND OF THE INVENTION

1. Field of the Invention

The present invention relates to a method for manufacturing a crash pad for a vehicle, and more particularly, to a method for manufacturing a crash pad for a vehicle which can reduce a manufacturing step and prevent deformation of a skin foam by molding a core and the skin foam in an integral body. In addition, the present invention relates to the crash pad for the vehicle manufactured by the above manufacturing method.

2. Description of Related Art

A crash pad for a vehicle is generally manufactured by injection-molding one kind of synthetic resin in a die.

After that, after an airbag is mounted at a passenger side, the crash pad is provided with an airbag tear line, which is machined by laser, at a portion built with a passenger airbag such that the passenger airbag is deployed. Recently, an area, provided with the passenger airbag, including a PAB tear line is made from a high-soft material by dual injection molding which injects two materials at the same time, in order to manufacture a crash pad which can easily open a PAB door.

FIG. 1 is a view illustrating a process of adhering a skin foam to a core of a crash pad for a vehicle in the related art after the core is injection-molded by the dual injection molding. FIG. 2A is a perspective view illustrating the core of the crash pad for the vehicle in the related art, and FIG. 2B is a view schematically illustrating a filling region of each material forming a crash pad body and the PAB door in FIG. 2A.

A crash pad 160 for a vehicle in the related art includes a core 170 having a crash pad body 172 and a PAB door 171, and a skin foam 180 adhered to a surface of the core 170 by an adhesive or the like.

The crash pad body 172 is made from a high-strength polypropylene fiber (PPF) resin, and the PAB door 171 is made from a thermoplastic olefin (TPO) resin having higher softness than that of the crash pad body 172 so as to easily deploy the airbag.

The core 170 is formed by the dual injection molding as shown in FIG. 2, and a process of forming the core will be described in detail. A TPO supply line 141 and a PPF supply line 142 connected to an injector are respectively connected to a cavity 140a for the PAB door and a cavity 150a for the crash pad body, and then the TPO resin and the PPF resin supplied from the injector are filled in the cavity 140a for the PAB door and the cavity 150a for the crash pad body, thereby completing the molding of the core 170.

A skin foam 180 is adhered to the surface of the dual-injected core 170 by an adhesive to form the crash pad 160.

However, in the case of the crash pad 160 in the related art, there is a problem in that since there is required for the process of the adhering the skin foam 180 to the surface of the core 170 after the core is injection-molded, manufacturing costs are increased.

In addition, there is another problem in that since the direction of the TPO resin filled from the injector to the cavity 140a for the PAB door is leaned toward the right side from the left side (refer to the arrow in FIGS. 2A and 2B), the TPO filling region is excessive and is not uniform.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a method for manufacturing a crash pad for a vehicle, in which since a core and a skin foam are integrally formed, a manufacturing process is reduced and thus manufacturing costs are decreased, and the crash pad manufactured by the same.

Another subject of the present invention is to provide a method for manufacturing a crash pad for a vehicle which can minimize and equalize a material filling region by setting a direction of a material to be filled into a cavity for a PAB door from an injector from a center to an outer side, and the crash pad manufactured by the same.

In an aspect of the present invention, the method for manufacturing a crash pad for a vehicle, may include the steps of (a) preparing a die including an upper die and a lower die for forming a first cavity for a Passenger Air Bag (PAB) door and a second cavity for a crash pad body, between the upper die and the lower die, (b) fixing a skin foam on an upper surface of the lower die, (c) moving the upper die in an upward direction in a predetermined distance and filling the first cavity for the PAB door with a first material and the second cavity for the crash pad body with a second material, in a state in which volumes of the first cavity for the PAB door and the second cavity for the crash pad body may be increased than volumes thereof in the steps of (a) and (b), (d) moving the upper die in a downward direction to compress the first and second materials against the lower die, while the first and second cavities may be filled with the first material and the second material, and (e) extracting a core of the PAB door and the crash pad body integrally formed with the skin foam from the die.

The upper die may include a first upper die portion for the PAB door which may be provided with the first cavity for the PAB door at a lower portion thereof, and a plurality of second upper die portions for the crash pad body, wherein the second upper die portions may be disposed around the first upper die for the PAB door and provided with the second cavity for the crash pad body at a lower portion thereof.

The first upper die portion for the PAB door may be provided with a first material gate at a center thereof, and the first material supplied from an injector may be moved to a center of the first cavity for the PAB door through the first material gate, and then may be moved to an outer side thereof.

The plurality of second upper die portions for the crash pad body may be provided with a second material gate at each center thereof, and the second material supplied from the injector may be moved to the second cavity for the crash pad body through the second material gate.

The first material may be a high-soft thermoplastic olefin (TPO) resin.

The second material may be a polypropylene fiber (PPF) resin.

The skin foam may be a polypropylene resin.

Also, the above-described subjects are achieved by the crash pad for the vehicle manufactured by the above manufacturing method.

With the method for manufacturing the crash pad for the vehicle and the crash pad manufactured by the same according to the present invention as described above, the process is eliminated by molding the core and the skin foam in an integral unit. In addition, after the upper die is moved in the upward direction and then the volumes of the cavity for the PAB door and the cavity for the crash pad body are increased, the cavities are filled with the first material and the second material to inject the core and the skin foam at a low pressure, thereby preventing deformation of the skin foam.

In addition, with the method for manufacturing the crash pad for the vehicle and the crash pad manufactured by the same according to the present invention, since the first material filled into the cavity for the PAB door from the injector is moved from the center to the outer side the filling region of the first material can be minimized and equalized.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
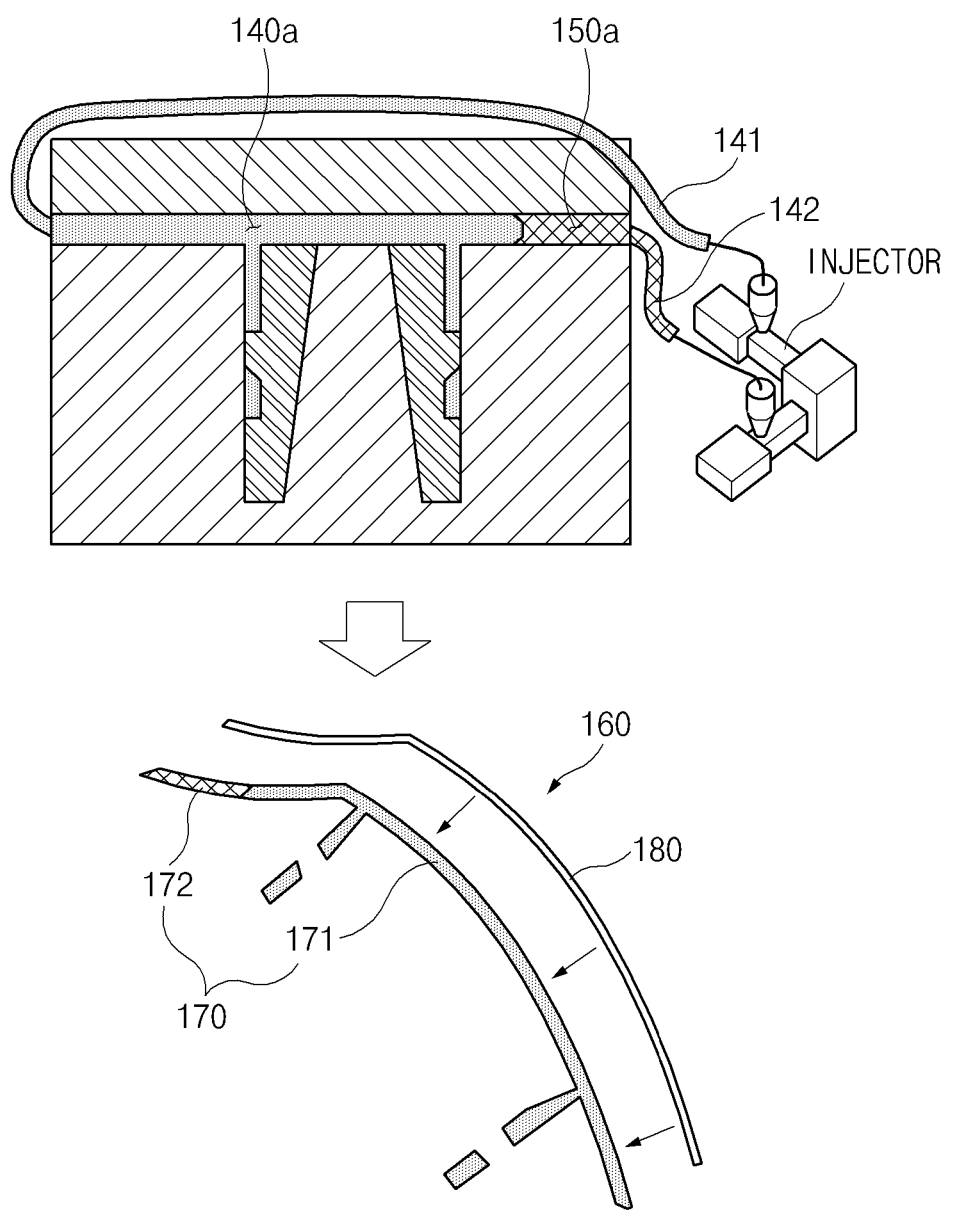
FIG. 1 is a view illustrating a process of adhering a skin foam to a cord of a crash pad for a vehicle in the related art after the core is injection-molded by the dual injection molding.
Figure 2A:
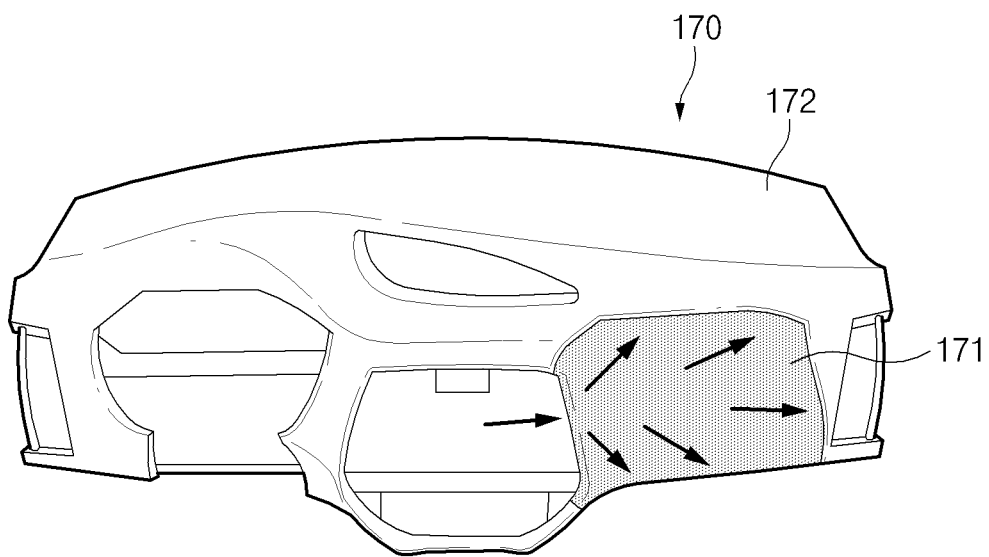
FIG. 2A is a perspective view illustrating a core of a crash pad for a vehicle in the related art.
Figure 2B:
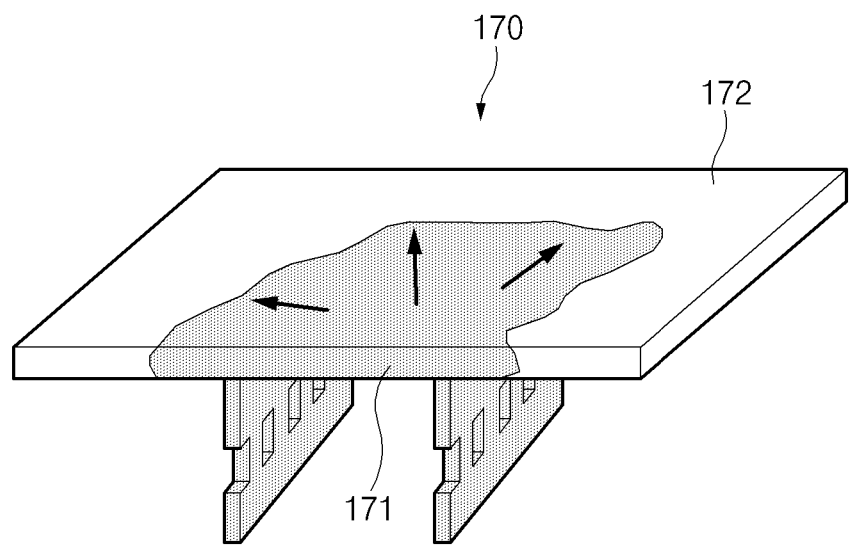
FIG. 2B is a view schematically illustrating a filling region of each material forming a crash pad body and a PAB door in FIG. 2A.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

A die 10 for manufacturing a crash pad for a vehicle according to an exemplary embodiment of the present invention will now be described with reference to FIGS. 3 to 6.

The die 10 includes an upper die 20 and a lower die 30. A first cavity 40a for a PAB door and a second cavity 50a for a crash pad body are formed in a space between the upper die 20 and the lower die 30.

In an exemplary embodiment of the present invention, the die 10 is configured in such a way that an upper die and a lower die of a conventional die are turned over, that is, the upper die in the related art serves as the lower die 30 and the lower die in the related art serves as the upper die 20. Therefore, a first material gate 41 which will be described later can be placed at a center of the first cavity 40a for the PAB door.

The upper die 20 includes a first upper die portion 40 for the PAB door and a plurality of second upper die portions 50 for the crash pad body which are disposed around the first upper die portion 40 for the PAB door.

In this instance, the lower portion of the first upper die portion 40 for the PAB door is provided with the first cavity 40a for the PAB door, and the lower portion of the plurality of second upper die portions 50 for the crash pad body is provided with the second cavity 50a for the crash pad body.

The first upper die portion 40 for the PAB door is provided with a first material gate 41 at a center thereof, and the plurality of second upper die portions 50 for the crash pad body is provided with a second material gate 52 at centers thereof.

The process of manufacturing the crash pad 60 for the vehicle according to an exemplary embodiment of the present invention will be described in detail.

(1) The die 10 including the upper die 20 and the lower die 30 for forming the first cavity 40a for the PAB door and the second cavity 50a for the crash pad body is prepared.

Figure 3:
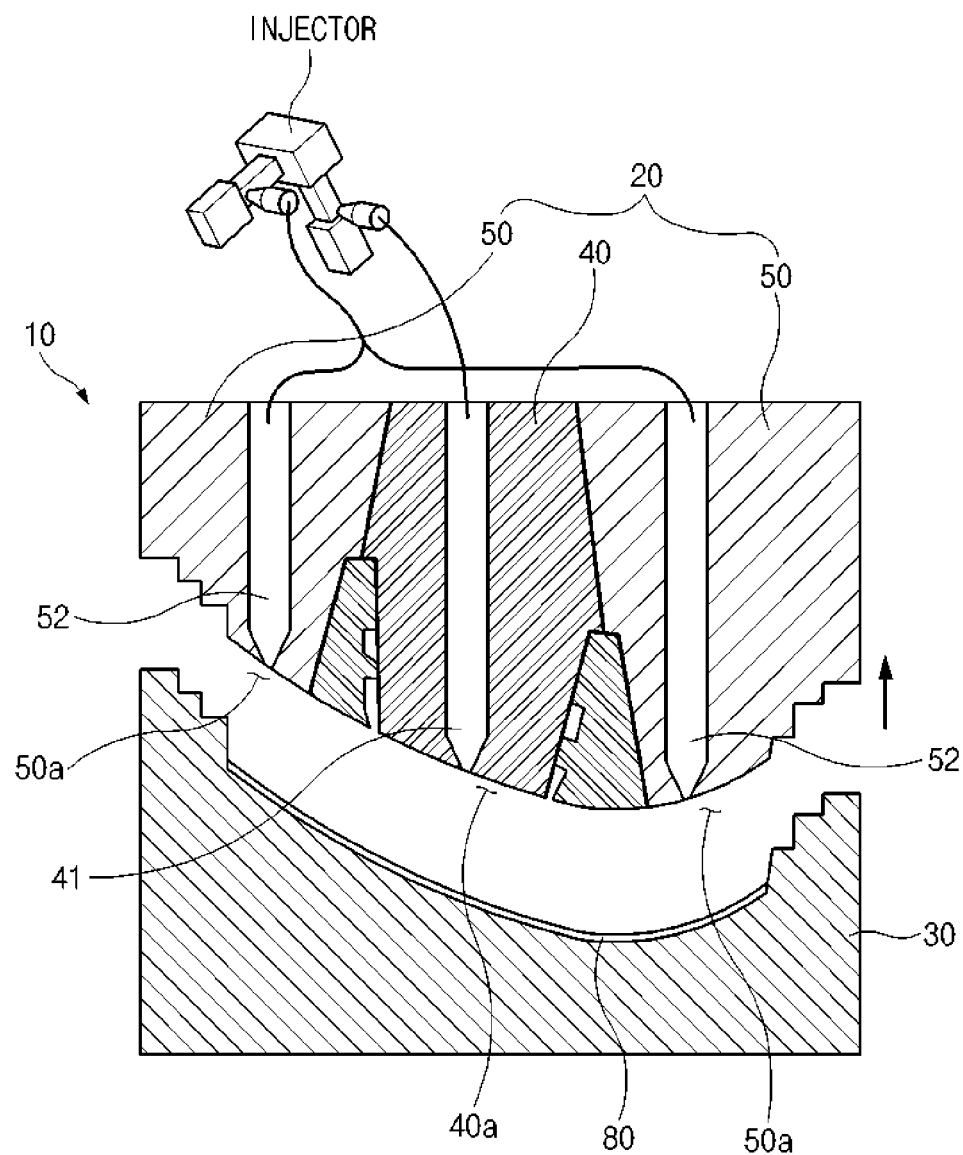
FIGS. 3 to 6 are views illustrating a process of sequentially manufacturing a crash pad for a vehicle according to an exemplary embodiment of the present invention.

(2) As shown in FIG. 3, the skin foam 80 is fixed on the upper surface of the lower die 30.

The skin foam 80 is integrally formed with the core 70, which will be described later, by using a principle of heat fusion in which the skin foam 80 is heat-fused to the core by using a polypropylene resin of the same series as the material of the crash pad body 72, which will be described later, through the entanglement caused by molecular diffusion of an interface.

(3) At an initial step of the resin filling, the upper die 20 is moved in the upward direction to increase the volumes of the first cavity 40a for the PAB door and the second cavity 50a for the crash pad body. The reason of moving the upper die 20 in the upward direction is that the pressure is minimized when the first cavity 40a for a PAB door and the second cavity 50a for a crash pad body are filled with the first material and the second material, respectively, thereby minimizing the deformation of the skin foam 80.

Figure 4:
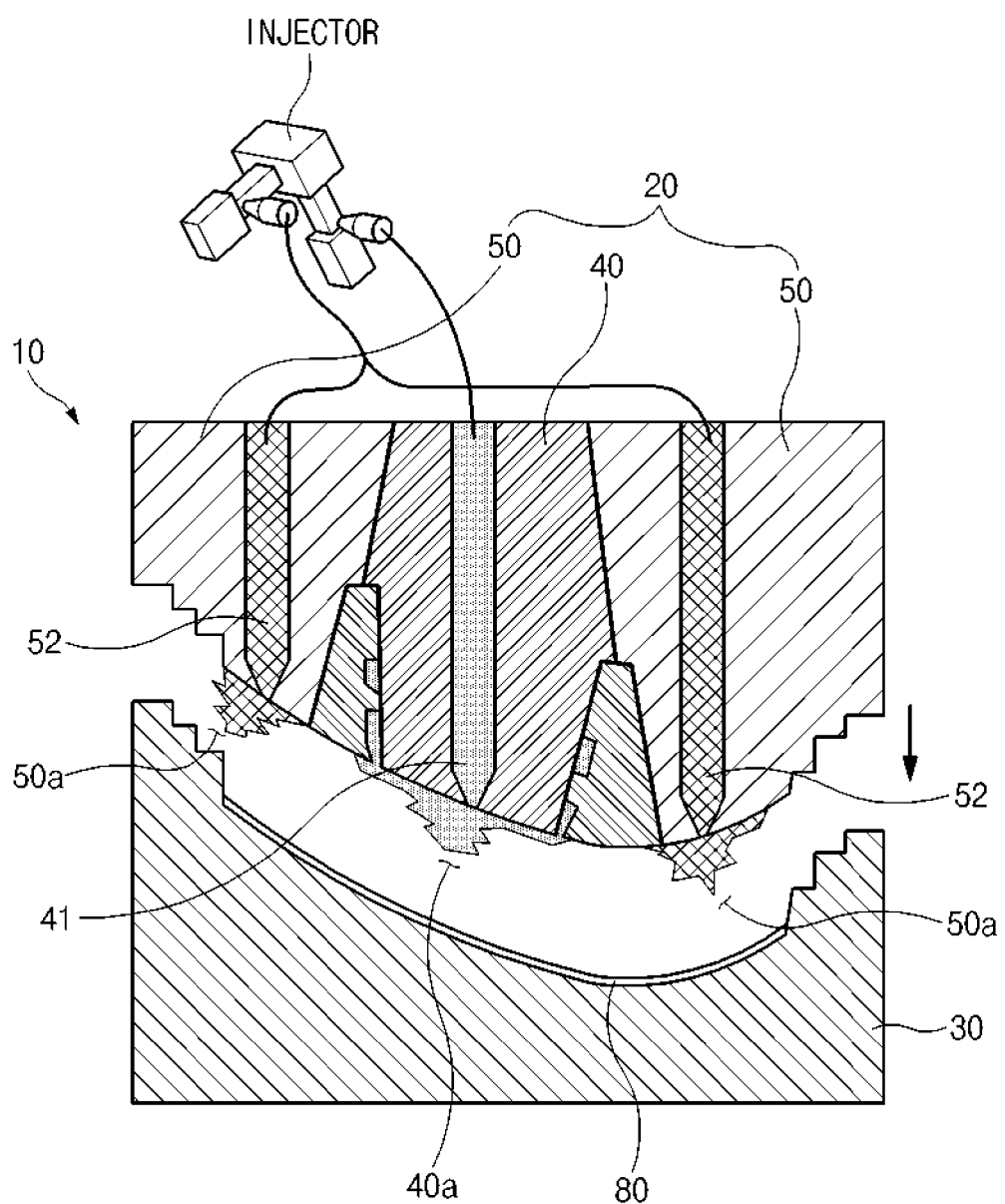

Next, in the state in which the upper die 20 is moved in the upward direction, as shown in FIG. 4, the first cavity 40a for the PAB door and the second cavity 50a for the crash pad body are filled with the first material and the second material.

At that time, the first material is a material forming a PAB door 71, and is a thermoplastic olefin (TPO) resin of a higher softness than that of the second material so as to easily deploy the airbag. The second material is a material forming a crash pad body 72, and is a polypropylene fiber (PPF) resin.

Figure 7A:
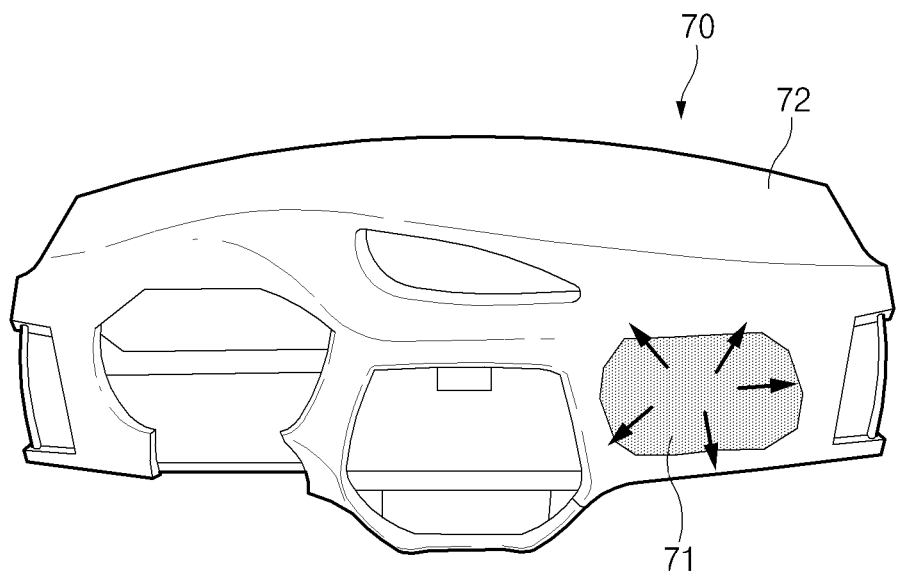
FIG. 7A is a view illustrating a flowing direction of a first material when a cavity for a PAB door in FIGS. 4 and 5 are filled with a first material.
Figure 7B:
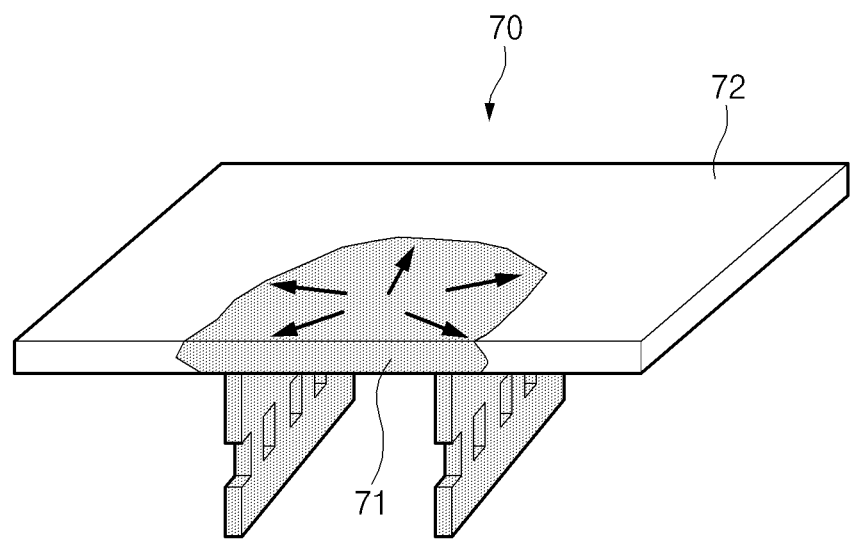
FIG. 7B is a view illustrating a filling region of each material forming a crash pad body and a PAB body in FIG. 7A.

Meanwhile, according to an exemplary embodiment of the present invention, different from the related art in which the first material is supplied from the lateral side of the cavity 140a for the PAB door in a biased way, the first material is supplied to the center of the first cavity 40a for the PAB door, and then is moved to the outer side (refer to the arrow in FIGS. 7A and 7B), the filling region of the first material can be minimized and equalized.

In addition, as the second material is supplied to the second cavity 50a for the crash pad body through the plurality of second material gates 52 which are dispersed and installed per region, from the injector, the filling rate can be improved even though the injection is performed at a low pressure.

Figure 5:
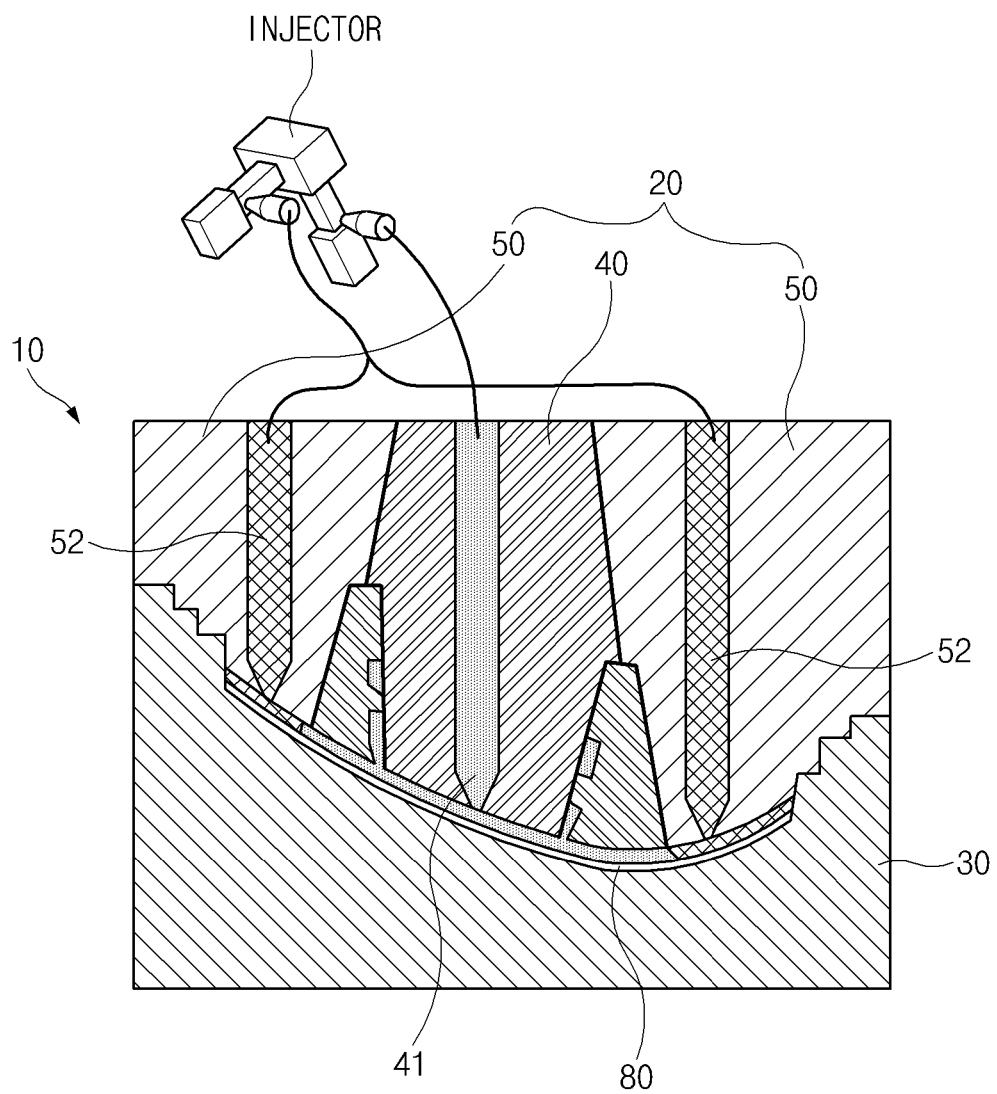

(4) After that, as shown in FIG. 5, the upper die 20 is moved in the downward direction to compress the upper die, while the cavities are filled with the first material and the second material.

Figure 6:
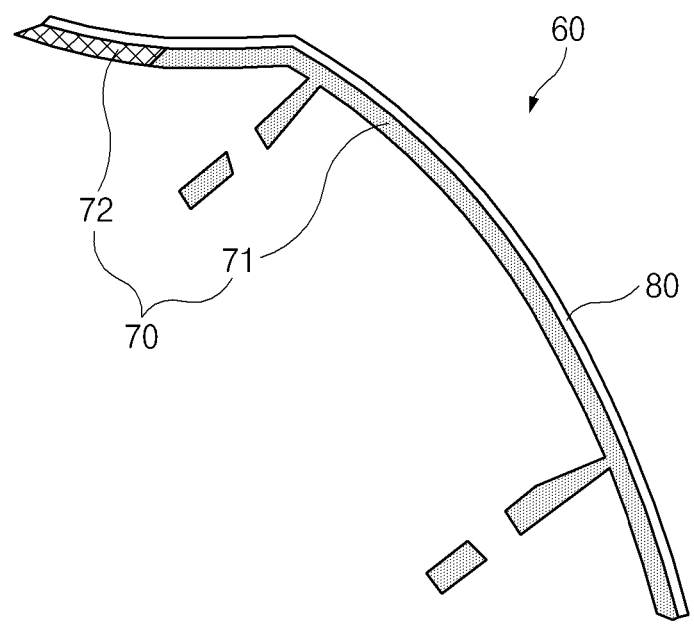

(5) The core 70 which is integrally formed with the skin foam 80 through the above steps is extracted from the die 10, thereby obtaining the crash pad 60, as shown in FIG. 6.

At that time, the crash pad 60 includes the core 70 having the crash pad 72 and the PAB door 71 which are formed by the dual injection molding, and the skin foam 80 which is inserted and integrally formed when the core 70 is injected.

According to an exemplary embodiment of the present invention, the process is eliminated by molding the core 70 and the skin foam 80 in an integral unit. In addition, after the upper die 20 is moved in the upward direction and then the volumes of the first cavity 40a for the PAB door and the second cavity 50a for the crash pad body are increased, the cavities are filled with the first material and the second material to inject the core and the skin foam at the low pressure, thereby preventing deformation of the skin foam 80.

In addition, since the first material filled into the first cavity 40a for the PAB door from the injector is moved from the center to the outer side, the filling region of the first material can be minimized and equalized.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method for manufacturing a crash pad for a vehicle, comprising the steps of:
    (a) preparing a die including an upper die and a lower die for forming a first cavity for a Passenger Air Bag (PAB) door and a second cavity for a crash pad body, between the upper die and the lower die;
    (b) fixing a skin foam on an upper surface of the lower die;
    (c) moving the upper die in an upward direction in a predetermined distance and filling the first cavity for the PAB door with a first material and the second cavity for the crash pad body with a second material, in a state in which volumes of the first cavity for the PAB door and the second cavity for the crash pad body are increased to new volumes than the volumes thereof in the steps of (a) and (b), thereby minimizing deformation of the skin foam;
    (d) moving the upper die in a downward direction to compress the first and second materials against the lower die, while the first and second cavities are filled with the first material and the second material; and
    (e) extracting a core of the PAB door and the crash pad body integrally formed with the skin foam from the die; and
    wherein the upper die includes a first upper die portion for the PAB door which is provided with the first cavity for the PAB door at a lower portion thereof, and a plurality of discrete second upper die portions for the crash pad body, wherein the second upper die portions are disposed around the first upper dieportion for the PAB door and provided with the second cavity for the crash pad body at a lower portion thereof;
    wherein the first upper die portion for the PAB door is provided with a first material gate at a center thereof and the first material supplied from an injector is moved to a center of the first cavity for the PAB door through the first material gate, and then is moved to an outer side thereof;
    wherein the plurality of second upper die portions for the crash pad body is provided with a second material gate at each center thereof, and the second material supplied from the injector is moved to the second cavity for the crash pad body through the second material gate.

2. The method for manufacturing the crash pad according to claim 1, wherein the first material is a high-soft thermoplastic olefin (TPO) resin.

3. The method for manufacturing the crash pad according to claim 1, wherein the second material is a polypropylene fiber (PPF) resin.

4. The method for manufacturing the crash pad according to claim 3, wherein the skin foam is a polypropylene resin.

* * * * *